US011132666B2

(12) United States Patent
Ni et al.

(10) Patent No.: US 11,132,666 B2
(45) Date of Patent: Sep. 28, 2021

(54) SERVICE PROCESSING METHOD AND APPARATUS

(71) Applicant: ADVANCED NEW TECHNOLOGIES CO., LTD., Grand Cayman (KY)

(72) Inventors: Fei Ni, Hangzhou (CN); Zongwang Hu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/421,188

(22) Filed: May 23, 2019

(65) Prior Publication Data

US 2019/0279190 A1    Sep. 12, 2019

Related U.S. Application Data

(63) Continuation of application No. PCT/CN2017/116509, filed on Dec. 15, 2017.

(30) Foreign Application Priority Data

Dec. 21, 2016  (CN) .......................... 201611195605.6

(51) Int. Cl.
*G06Q 20/32* (2012.01)
*H04L 29/06* (2006.01)
*H04L 29/08* (2006.01)

(52) U.S. Cl.
CPC .......... *G06Q 20/325* (2013.01); *H04L 67/32* (2013.01); *H04L 67/42* (2013.01); *H04L 67/10* (2013.01)

(58) Field of Classification Search
None
See application file for complete search history.

(56) References Cited

U.S. PATENT DOCUMENTS

| 7,110,979 | B2 | 9/2006 | Tree |
| 9,390,412 | B2 | 7/2016 | Weber et al. |
| 10,402,064 | B1 | 9/2019 | Al-Sallami et al. |
| 2006/0271497 | A1 | 11/2006 | Cullen et al. |

(Continued)

FOREIGN PATENT DOCUMENTS

| CN | 102546165 A | 7/2012 |
| CN | 102761580 A | 10/2012 |

(Continued)

OTHER PUBLICATIONS

Written Opinion of the International Searching Authority and International Search Report for PCT Application No. PCT/CN2017/116509 dated Feb. 28, 2018 (14 pages).

(Continued)

*Primary Examiner* — Edward Chang
*Assistant Examiner* — Amit Patel

(57) ABSTRACT

Embodiments of the application provide methods and apparatuses for transaction processing. One method comprises: receiving a first transaction result from a first server, wherein the first transaction result is generated in response to a first transaction request from a client; determining a type corresponding to the first transaction result; generating a second transaction result matching the type corresponding to the first transaction result; and sending the generated second transaction result to the client in response to a second transaction request from the client.

12 Claims, 5 Drawing Sheets

(56) References Cited

U.S. PATENT DOCUMENTS

| | | |
|---|---|---|
| 2007/0011093 A1 | 1/2007 | Tree |
| 2008/0208762 A1 | 8/2008 | Arthur et al. |
| 2010/0161433 A1 | 6/2010 | White |
| 2010/0174974 A1 | 7/2010 | Brisebois et al. |
| 2011/0209045 A1 | 8/2011 | Ghosh et al. |
| 2014/0173420 A1 | 6/2014 | Jeong |
| 2014/0222666 A1 | 8/2014 | Feng et al. |
| 2014/0279099 A1 | 9/2014 | Vos et al. |
| 2015/0242844 A1 | 8/2015 | Yisraelian et al. |
| 2019/0034929 A1 | 1/2019 | Tang et al. |
| 2019/0045029 A1 | 2/2019 | Hu |
| 2019/0102778 A1 | 4/2019 | Lebovic |
| 2019/0279190 A1 | 9/2019 | Ni et al. |

FOREIGN PATENT DOCUMENTS

| | | |
|---|---|---|
| CN | 103164790 A | 6/2013 |
| CN | 103366303 A | 10/2013 |
| CN | 103729768 A | 4/2014 |
| CN | 104599125 A | 5/2015 |
| CN | 107070858 A | 8/2017 |
| CN | 107295052 A | 10/2017 |
| JP | 2001-344550 A | 12/2001 |
| JP | 2011-210171 A | 10/2011 |
| JP | 2015-531518 A | 11/2015 |
| WO | 0198858 A2 | 12/2001 |
| WO | 2015/003050 A1 | 1/2015 |

OTHER PUBLICATIONS

International Preliminary Report on Patentability Chapter I for PCT Application No. PCT/CN2017/116509 dated Jul. 4, 2019 (12 pages).
First Search Report dated Nov. 13, 2019, issued in related Taiwan Application No. 106132579 (1 page).
Supplemental Search Report dated May 11, 2020, issued in related Taiwan Application No. 106132579 (1 page).
Search Report and Written Opinion dated May 18, 2020, issued in related Singapore Application No. 11201905293T (8 pages).
First Search for Chinese Application No. 201611195605.6 dated Sep. 19, 2019 (1 page).
First Office Action for Chinese Application No. 201611195605.6 dated Sep. Sep. 27, 2019 with English machine tranlsation (17 pages).
Second Office Action for Chinese Application No. 201611195605.6 dated Feb. 3, 2020.
Supplementary Search for Chinese Application No. 201611195605.6 dated Jan. 18, 2020 (1 page).
Third Office Action for Chinese Application No. 201611195605.6 dated May 12, 2020.
Search Report for European Application No. 17882785.3 dated Mar. 30, 2020.
Written Opinion for Singaporean Application No. 11201905293T dated May 26, 2020.
Office Action for Korean Application No. 10-2019-7017251 dated Jun. 29, 2020.
Office Action for Japanese Application No. 2019-534167 dated Jul. 28, 2020.

SERVICE PROCESSING METHOD AND APPARATUS

CROSS-REFERENCE TO RELATED APPLICATIONS

The present application is a continuation application of International Patent Application No. PCT/CN2017/116509, filed on Dec. 15, 2017, which is based on and claims priority to the Chinese Patent Application No. 201611195605.6, filed on Dec. 21, 2016 and entitled "Transaction Processing Method and Apparatus." The above-referenced applications are incorporated herein by reference in their entirety.

TECHNICAL FIELD

The application relates to the field of computer technologies, and in particular, to a transaction processing method and apparatus.

BACKGROUND

An online system (e.g., a website) may provide plenty of transaction services to users with support of a back-end transaction system. Some transactions may be carried out jointly by different transaction systems. In current technologies, a transaction request may be initiated by a user via a client. The client may be, for example, a browser, an application (APP), etc. According to a transaction flow, a transaction system that first processes the transaction request may generate a corresponding processing result (which may be referred to as an intermediate result) and return the processing result to the client. The client may redirect, according to the intermediate result, to the next transaction system in the transaction flow and initiate a request (which may be referred to as an intermediate request) for the next transaction system to perform subsequent processing, and so on, until the entire transaction flow is completed.

For example, a transaction request sent by a client can be carried out jointly by a transaction system A and a transaction system B. According to a transaction flow, the transaction request is first processed by the transaction system A to generate an intermediate result a, and the transaction system A returns the intermediate result a to the client. The client redirects, according to the intermediate result a, to the transaction system B, and further sends a request to the transaction system B. The transaction system B may process the request from the client to generate a processing result b, and return the processing result b to the client.

In the current technologies, the transaction systems interact with the client via the Internet. The network environment of the Internet, however, has relatively low stability, and a network delay may be caused due to the low stability of the network environment. As a result, it may take a relatively long time for the intermediate request to be sent to the next transaction system. In addition, the transaction system performs corresponding processing only after receiving a request from the client. But an online system is typically faced with a tremendous amount of user accesses. Consequently, the transaction systems may have high workloads, causing a delay in the processing queue of the transaction systems. Apparently, a delay may occur in both the transmission stage and the processing stage of a request, which inevitably leads to a long waiting time of the client and a poor timeliness of the transaction processing.

SUMMARY

Embodiments of the specification provide methods and apparatuses for transaction processing to solve the problem of poor timeliness in the existing transaction processing technologies.

The embodiments of the specification provide a computer-implemented method for transaction processing. The method may comprise: receiving a first transaction result from a first server. The first transaction result may be generated in response to a first transaction request from a client. The method may further comprise: determining a type corresponding to the first transaction result; generating a second transaction result matching the type corresponding to the first transaction result; and sending the generated second transaction result to the client in response to a second transaction request from the client.

In some embodiments, the first transaction request may be a request for placing an order, the first transaction result may comprise data of the order, and the second transaction result may comprise a payment interface or an exception page.

In other embodiments, determining a type corresponding to the first transaction result may comprise: determining a type identifier of the first server based on the data of the order.

In still other embodiments, generating a second transaction result may comprise: determining a page template corresponding to the order according to the type identifier of the first server and a corresponding relationship between type identifiers of servers and page templates; labeling data of the order that matches the determined page template; and generating the second transaction result according to the labeled data of the order.

In yet other embodiments, generating the second transaction result according to the labeled data of the order comprises: determining a payment state according to the data of the order; and in response to the payment state being that a payment is allowed to be made, rendering the payment interface according to the labeled data of the order.

In other embodiments, the method may further comprise: in response to the payment state being that a payment is not allowed to be made, deleting labels of the labeled data of the order, and rendering the exception page.

In still other embodiments, the data of the order may comprise an identifier of the client, and the method may further comprise: establishing a corresponding relationship between the identifier of the client and the payment interface or the exception page.

In yet other embodiments, sending the generated second transaction result to the client in response to a second transaction request may comprise: determining the identifier of the client in the second transaction request; and sending the generated payment interface or exception page corresponding to the identifier of the client to the client.

The embodiments of the specification further provide another computer-implemented method for transaction processing. The method may comprise: receiving, by a first server, a first transaction request from a client; generating a first transaction result according to the first transaction request; and sending the first transaction result to a second server to cause the second server to determine a type corresponding to the first transaction result, generate a second transaction result matching the type corresponding to the first transaction result, and send the generated second transaction result to the client after the second server receives a second transaction request generated by the client according to the first transaction result.

The embodiments of the specification provide an apparatus for transaction processing. The apparatus may comprise: one or more processors and one or more non-transitory computer-readable memories coupled to the one or more processors and configured with instructions executable by the one or more processors to cause the apparatus to perform operations comprising: receiving a first transaction result from a first server. The first transaction result may be generated in response to a first transaction request from a client. The operations may further comprise: determining a type corresponding to the first transaction result; generating a second transaction result matching the type corresponding to the first transaction result; and sending the generated second transaction result to the client in response to a second transaction request from the client.

The embodiments of the specification further provide another apparatus for transaction processing, comprising: a receiving module configured to receive a first transaction request sent by a client; a generating module configured to generate a first transaction result according to the first transaction request; and a sending module configured to send the first transaction result to a second server, to cause the second server to determine a type corresponding to the first transaction result, generate a second transaction result matching the type corresponding to the first transaction result, and send the generated second transaction result to the client after the second server receives a second transaction request generated by the client according to the first transaction result.

The embodiments of the application provide methods and apparatuses for transaction processing. According to the methods, after the first server receives the first transaction request sent by the client, the first server processes the first transaction request and generates a corresponding first transaction result; in addition to returning the first transaction result to the client, the first server may also send, according to a transaction flow, the first transaction result to the second server, and the second server may determine a type corresponding to the first transaction result. This way, the second server may process the first transaction result to generate a second transaction result matching the type in advance. In other words, the second server may generate the second transaction result before the second server receives a second transaction request sent by the client. When the second server receives the second transaction request sent by the client, the second server may send the generated second transaction result to the client. Moreover, the generated second transaction result matches the transaction type of the first transaction result. In contrast to the manner in the current technologies, according to the disclosure, the second server may generate a second transaction result in advance according to the first transaction result before the second server receives a second transaction request from the client, thereby effectively saving waiting time of the client and improving the timeliness for processing a transaction request.

BRIEF DESCRIPTION OF THE DRAWINGS

The accompanying drawings to be described here are used to provide a better understanding of the application and constitute a part of the application. The embodiments of the application are used to describe the application and are not improper limitations to the application. In the accompanying drawings.

DETAILED DESCRIPTION

To make objects, technical solutions, and advantages of the application clearer, the application will be described in detail below with reference to the embodiments and the accompanying drawings of the application. It is obvious that the described embodiments are merely some, but not all, embodiments of the application. On the basis of the embodiments of the application, all other embodiments obtainable by one of ordinary skill in the art without creative effort shall fall within the scope of the application.

As described above, when a user obtains, from an online system and via a client, a transaction that is to be carried out jointly by two or more transaction systems, the client may receive intermediate transaction results returned by the different transaction systems, redirect according to the intermediate results, and send a request to a next transaction system until the entire transaction flow is completed. When the client sends a request to a transaction system in this process, however, the client tends to be affected by the network environment and may experience transmission delay. Moreover, a transaction system in the current technologies can perform processing only after the transaction system receives a transaction request sent by the client. In the situation that the transaction system has a high workload, a processing delay may also be caused when the transaction system processes the transaction request. This way, the client is subject to impacts by both a transmission delay and a processing delay, leading to a long waiting time of the client. Apparently, the timeliness of the transaction request is severely impacted.

A transaction processing method capable of reducing the waiting time of the client is provided in the embodiments of the application. A transaction accessible to a user via the client from an online system is often to be carried out jointly by two or more transaction systems, and therefore, the client may initiate different transaction requests to the different transaction systems according to a transaction flow. The different transaction requests may be initiated by the client to carry out the same transaction.

Figure 1A:
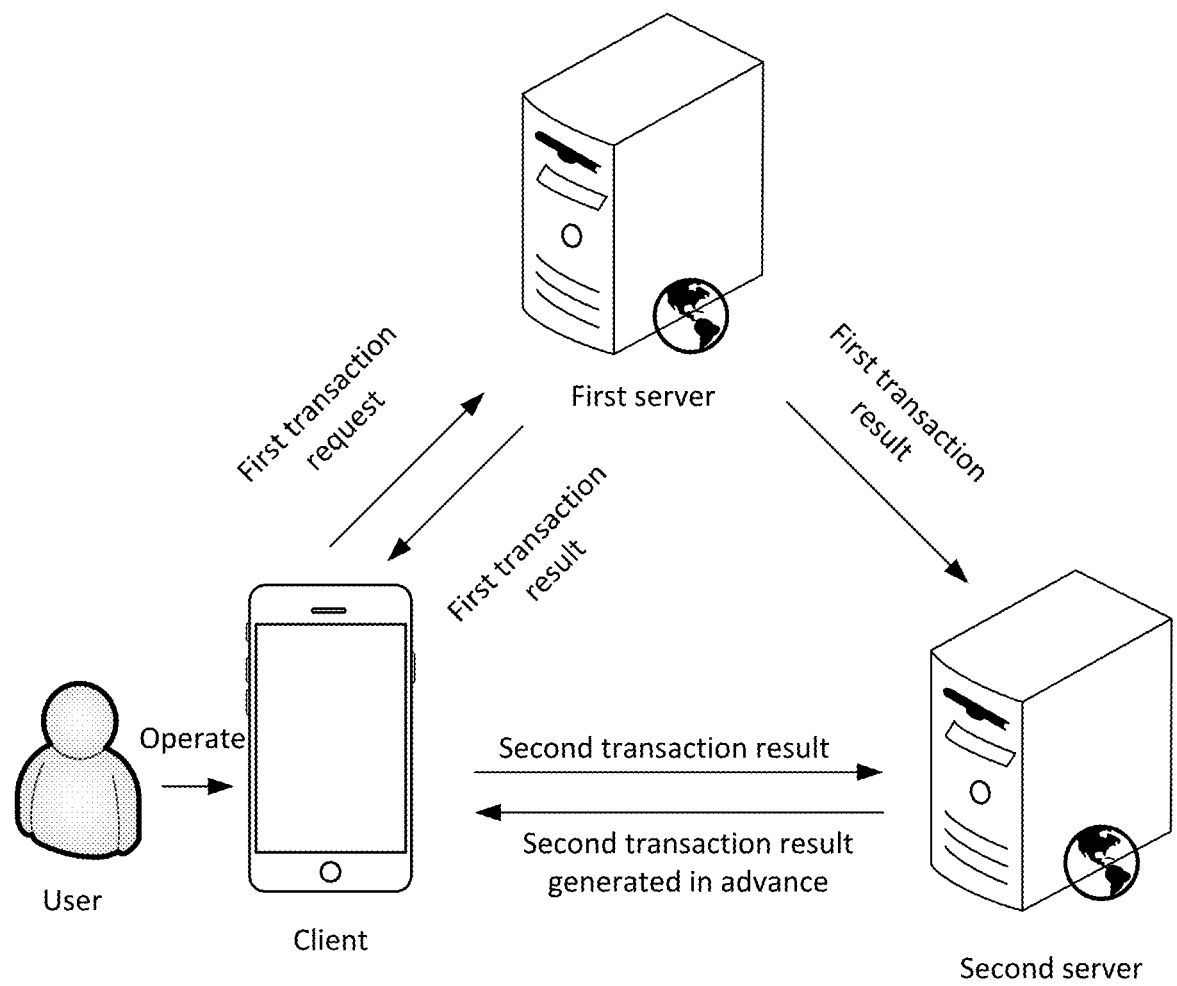
FIG. 1a is a schematic diagram of an architecture on which a process for transaction processing is based according to some embodiments of the application.

The transaction processing method according to the embodiments of the application is based on an architecture shown in FIG. 1a. As shown in FIG. 1a, the architecture includes a transaction client (also referred to as a "client" hereinafter) used by a user, a first server, and a second server. The client may be a browser, an Application ("APP"), etc., installed on a terminal. The first server and the second server may have different transaction functions. For example, the first server and the second server may be two transaction servers adjacent to each other in a transaction flow. The second server may be the transaction server after the first server in the processing order of the transaction flow. For example, assuming that there are three transaction servers A, B and C, and a transaction is to be carried out by the three transaction servers in an order of the server A, server B and server C. With regard to the transaction servers A and B, the first server may be the transaction server A and the second server may be the transaction server B; with regard to the transaction servers B and C, the first server may be the transaction server B and the second server may be the transaction server C. In other words, the first server and the second server are not limited to scenarios of only two servers.

Figure 1B:
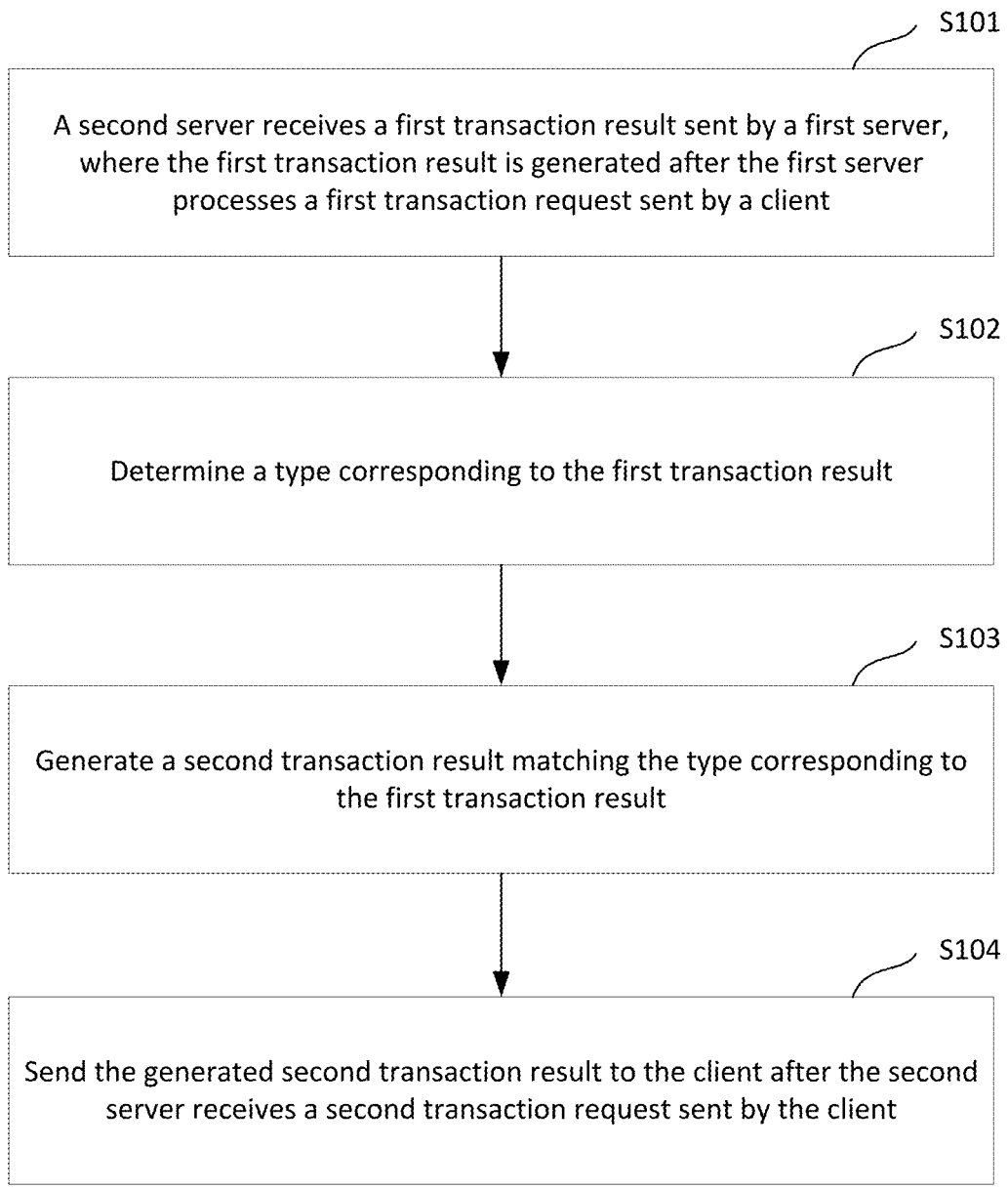
FIG. 1b is a schematic diagram of a process for transaction processing implementable by a second server according to some embodiments of the application.

The transaction processing method according to the application will be described below with reference to the architecture shown in FIG. 1a. In some embodiments, the transaction processing process may include the following steps, as shown in FIG. 1b.

Step S101: a second server receiving a first transaction result sent by a first server.

In some embodiments, the first transaction result is generated after the first server processes a first transaction request sent by a client. When a user uses a client to obtain a transaction, the client may send a transaction request to a corresponding transaction server. For example, after the user places an order of a product, the client sends a request for placing the order to a server for processing the order. The server for processing the order may be referred to as the first server and the request for placing the order may be referred to as the first transaction request. The first transaction request may be received by the first server. The first transaction request may be either a transaction request sent by the client according to an operation instruction of the user, or a transaction request sent by the client after the client receives an intermediate transaction result fed back by a previous transaction server in the transaction flow. For example, the first transaction result may be deemed as the intermediate transaction result generated after the first server performs corresponding processing on the first transaction request.

In existing technologies, a delay may be caused in the process that the client sends a second transaction request to the second server due to the impact of the network environment, and a processing delay may also be caused when the second server receives and processes the second transaction request. Apparently, these two situations may both lead to a long waiting time for the client. Therefore, to reduce the waiting time of the client, in some embodiments, in addition to send the first transaction result to the client, the first server may also send the first transaction result to the second server. Then, the second server may perform processing in advance according to the first transaction result.

S102: determining a type corresponding to the first transaction result.

In some embodiments, the type corresponding to the first transaction result may be a type corresponding to the first server. First servers of different transaction providers may have different types (e.g., types of the transactions provided by the providers, types of the transaction providers). Correspondingly, there may be different requirements for the type of the second transaction result.

For example, a telecommunication operator (for which the first server is a telecommunication operator server) and a bank (for which the first server is a bank server) are different transaction providers. Apparently, the first transaction result produced by the telecommunication operator server may relate to telecommunication transactions, while the first transaction result produced by the bank server may relate to financial transactions. Thus, the types of the second transaction results subsequently produced by the two transaction providers may also be different. Therefore, the types corresponding to the first transaction results may be determined to facilitate subsequent operations.

S103: generating a second transaction result matching the type corresponding to the first transaction result.

In some embodiment, after the second server receives the first transaction result, the second server may process the first transaction result to generate a second transaction result matching the type of the first transaction result. For example, the second server may generate a second transaction result of the same type as that of the first transaction result before receiving a second transaction request for the second transaction result.

S104: sending the generated second transaction result to the client after the second server receives a second transaction request sent by the client.

In some embodiments, after the second server receives the second transaction request, the second server may send the second transaction result generated in step S103 to the client, thereby reducing or avoiding the waiting time of the client.

Through the above-described steps, after the first server receives the first transaction request sent by the client, the first server processes the first transaction request and generates a corresponding first transaction result; in addition to returning the first transaction result to the client, the first server may also send, according to a transaction flow, the first transaction result to the second server, and the second server may determine a type corresponding to the first transaction result. This way, the second server may process the first transaction result to generate a second transaction result matching the type in advance. In other words, the second server may generate the second transaction result before the second server receives a second transaction request sent by the client. When the second server receives the second transaction request actually sent by the client, the second server may send the generated second transaction result to the client. Moreover, the generated second transaction result matches the transaction type of the first transaction result. In contrast to the manner according to the current technologies, according to the disclosure, the second server may generate a second transaction result in advance according to the first transaction result before the second server receives a second transaction request from the client, thereby effectively saving waiting time of the client and improving the timeliness for processing a transaction request.

An example of a payment transaction scenario applying the above-described transaction processing method will be described in detail. A user may use a client of a shopping website to buy a product from the shopping website. The user's purchase of the product via the client may involve two operations, e.g., placing an order of the product and making a payment. A payment transaction provider (e.g., a payment platform) provides payment transactions in this process. For example, the order placing is carried out by a server for processing the order (also referred to as a "server for orders" or an "order server," hereinafter) at the back end of the shopping website, while the payment transaction is carried out by a server for processing the payment (also referred to as a "payment server," hereinafter) at the back end of the payment platform. Then, in this scenario, the first transaction request may be a request for placing the order, the first server may include the order server, the first transaction result may include the order's information (also referred to as data of the order), the second server may include the payment server, and the second transaction result may include a payment interface or an exception page.

In this scenario, in the above-described step S101, the second server receiving a first transaction result sent by the first server may include: the payment server receives the data of the order sent by the order server, where the data of the order may include a serial order number, a type identifier of the first server, data of a payment state, account information, information of the goods, the amount of payment, etc.

In the above-described step S102, the determining a type corresponding to the first transaction result comprises: determining a type identifier of the order server included in the data of the order. In some embodiments, the type identifier of the first server may include: the name of a transaction provider to which the first server belongs, industry category information, the name of the first server, a device serial number, etc.

In some embodiments, generating a second transaction result matching the type corresponding to the first transaction result may include: determining a page template corresponding to the data of the order according to a pre-established corresponding relationship between type identifiers and page templates, labeling data of the order matching the page template according to the determined page template, and rendering and constructing a payment page according to the labeled data of the order.

In an example of a payment scenario, different payment pages may be generated for different first servers, i.e., order servers (e.g., a shopping website server, a telecommunication operator server, etc.). Therefore, different payment page templates may be stored in a payment server for the different order servers. The data of the order sent by an order server may also include a type identifier of the order server, and thus a corresponding payment page template may be determined accordingly.

Different payment page templates may have different data of orders to be rendered. For example, for a payment page of a shopping website, a user's data, such as an order number, a payment amount, a mailing address, etc., may be displayed on the payment page; while for a payment page of refilling a mobile phone card, data such as an order number, a mobile phone number to be refilled, a refill amount, etc. may be displayed on the payment page. Apparently, data of the orders to be rendered is different for these two types of payment pages.

In addition, in an example of a payment scenario, there may be two situations with respect to the payment and therefore two types of the payment pages correspondingly. In one situation, the payment page may be successfully rendered, and in the other situation, a problem may occur in the payment process and an exception page may be displayed. In some embodiments, before the payment server renders a page, the payment server may determine whether a payment can be made successfully. Accordingly, rendering and constructing a payment page according to the labeled data of the order may include: determining a payment state according to the data of the order, and when it is determined that the payment state is that a payment is allowed to be made (e.g., there is a sufficient balance in the user's account), rendering and constructing a payment page according to the labeled data of the order.

In some embodiments, the process that the payment server determines a payment state according to the data of the order may be implemented based on an account pre-registered by the user. There may be two situations according to this manner. First, if the order server and the payment server belong to the same transaction provider, the account registered by the user with the transaction provider may be available to both the order server and the payment server. For example, the payment server may be authorized to check the balance of the user's account, and determine whether a payment can succeed. Second, if the order server and the payment server belong to different transaction providers, the accounts registered by the user with the two transaction providers may be associated. This way, the payment server may still be authorized to check the balance of the account registered by the user with the order server, and determine whether a payment can succeed.

In some embodiments, if it is determined that the payment state (e.g., represented by a notification message) is that a payment is not allowed to be made (e.g., because there is no sufficient balance in the user's account), the method further include: deleting labels of the data of the order and rendering and constructing an exception page.

In some embodiments, after a corresponding page (including the above-described payment page or exception page) is generated, data that has been successfully rendered may be labeled for subsequent optimization of the system.

In some embodiments, the data of order may further include a client identifier, e.g., an identifier of the client, based on which the method may further include: establishing a corresponding relationship between the client identifier and the payment page or exception page. This way, sending the generated second transaction result to the client may include: determining an identifier of the client in the second transaction request, and sending the generated payment page or exception page corresponding to the identifier of the client to the client.

Accordingly, after the payment server receives a payment request sent by the client, the payment server may send a payment page or exception page that is rendered and constructed in advance back to the client. Therefore, the adoption of the above manner may save the time taken by the client to complete the payment flow.

Figure 2:
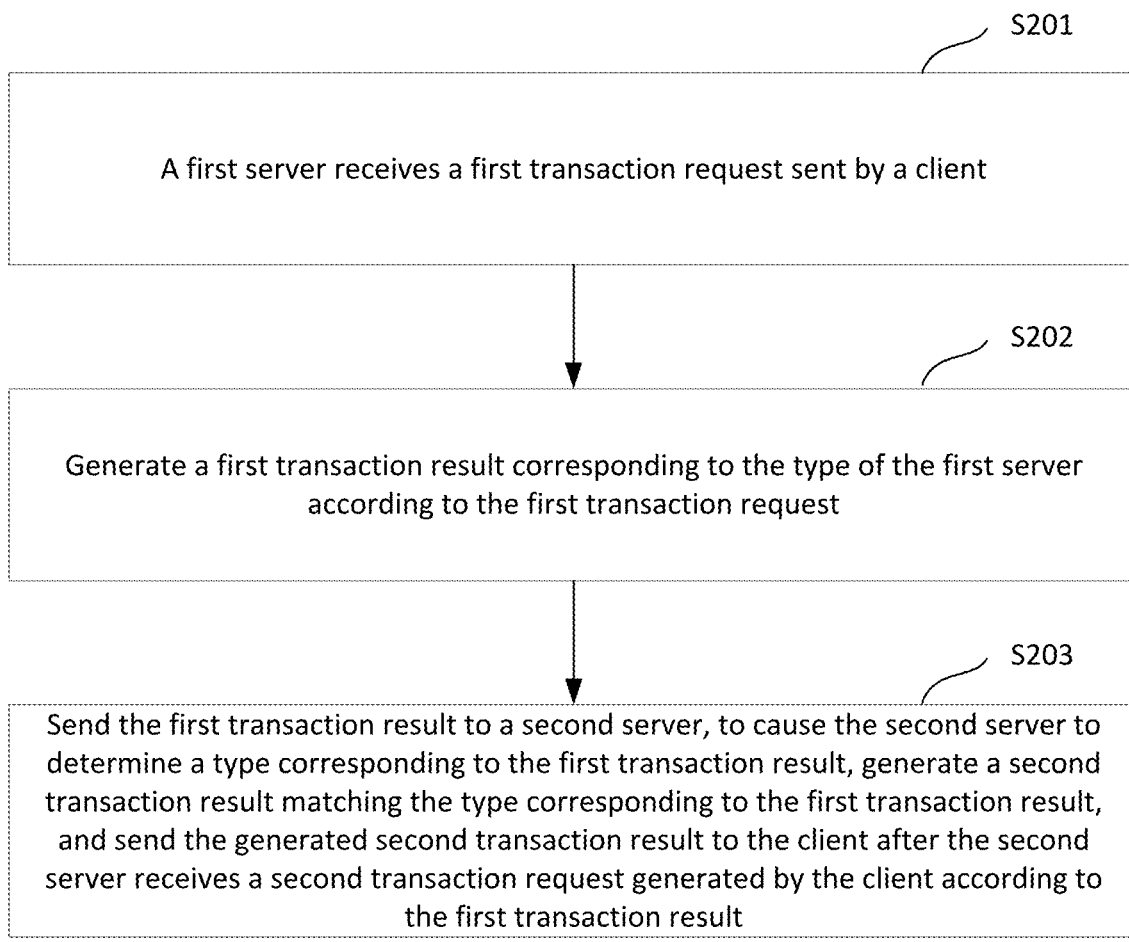
FIG. 2 is a schematic diagram of a process for transaction processing implementable by a first server according to some embodiments of the application.

The above-described may be from the perspective of the second server. In some embodiments, a transaction processing method implementable by the first server is further provided. As shown in FIG. 2, the method may include the following steps.

Step S201: a first server receiving a first transaction request sent by a client.

Step S202: generating a first transaction result corresponding to the type of the first server according to the first transaction request.

In some embodiments, after the first server receives the first transaction request, the first server may process the first transaction request to generate a corresponding transaction result, i.e., the first transaction result. The first transaction result may be referred to as an intermediate transaction result. In some embodiments, the first transaction request may include identifier information of the client (e.g., an identifier of the client). The first transaction result generated by the first server may also include the identifier information of the client.

Step S203: sending the first transaction result to the second server, to cause the second server to determine a type corresponding to the first transaction result, generate a second transaction result matching the type corresponding to the first transaction result, and send the generated second transaction result to the client after the second server receives a second transaction request generated by the client according to the first transaction result.

Figure 3:
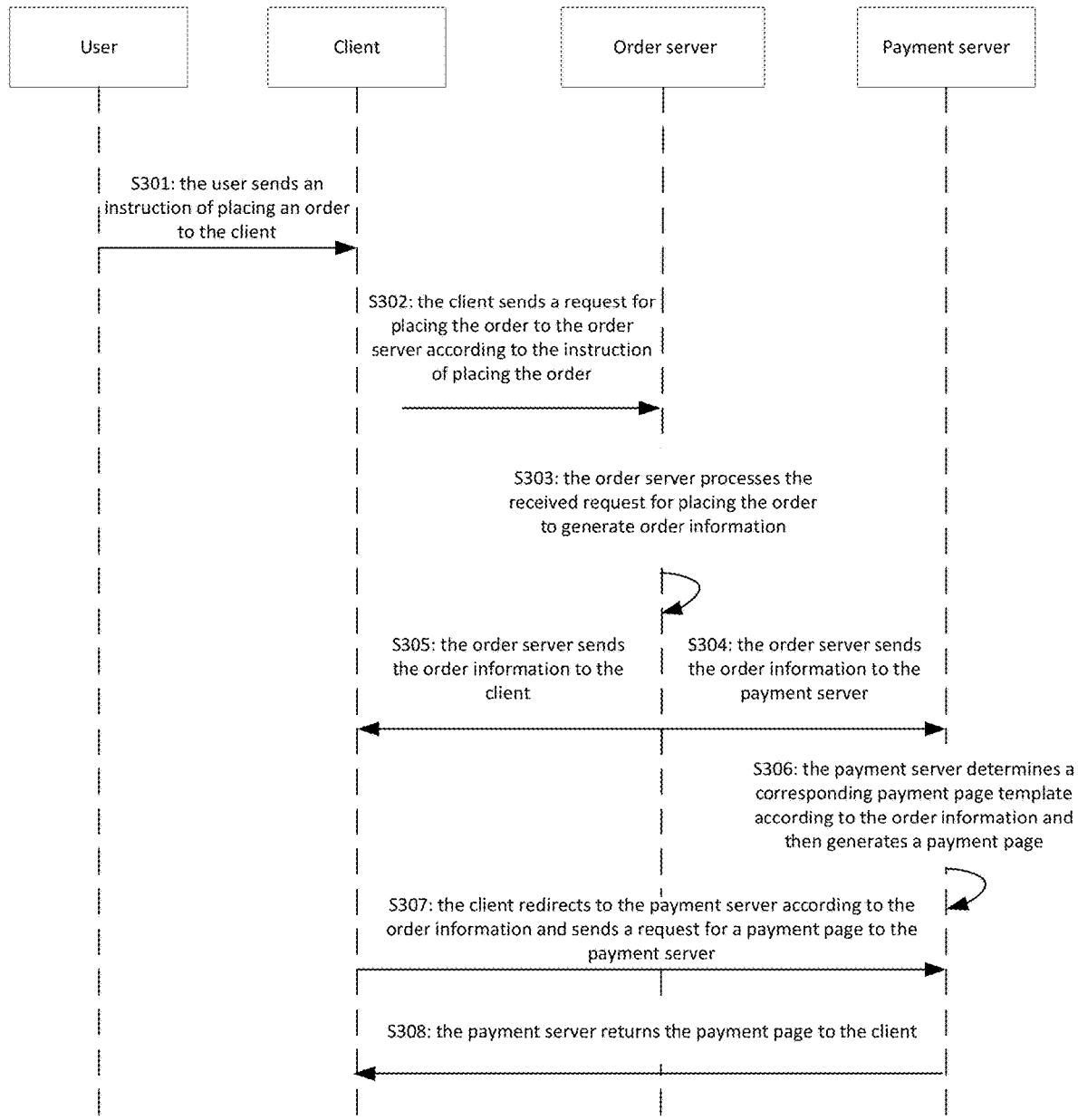
FIG. 3 is a schematic diagram of a process for transaction processing in an example of an application according to some embodiments of the application.

In an example of an application, a transaction flow in the above-described scenario is shown in FIG. 3. The transaction flow may include the following steps.

Step S301: a user sends an instruction of placing an order to a client.

Step S302: the client sends a request for placing the order to an order server according to the instruction of placing the order.

Step S303: the order server processes the received request for placing the order to generate order information.

Step S304: the order server sends the order information to a payment server, causing the payment server to execute Step S306.

Step S305: the order server sends the order information to the client, causing the client to execute Step S307.

Step S306: the payment server determines a corresponding payment page template according to the order information and then generates a payment page.

Step S307: the client redirects to the payment server according to the order information and sends a request for a payment page to the payment server.

Step S308: the payment server returns the payment page to the client.

From the above-described example of a payment scenario, once an order server generates order information, the order server immediately sends the order information to a payment server for processing to generate a payment page. Then, after a client sends a request for a payment page to the payment server, the payment server may immediately return the generated payment page to the client. Apparently, this manner effectively reduces the waiting time of the client for the generation of a payment page, and enables the user to more quickly browse the payment page to complete the payment transaction on the payment page.

Figure 4:
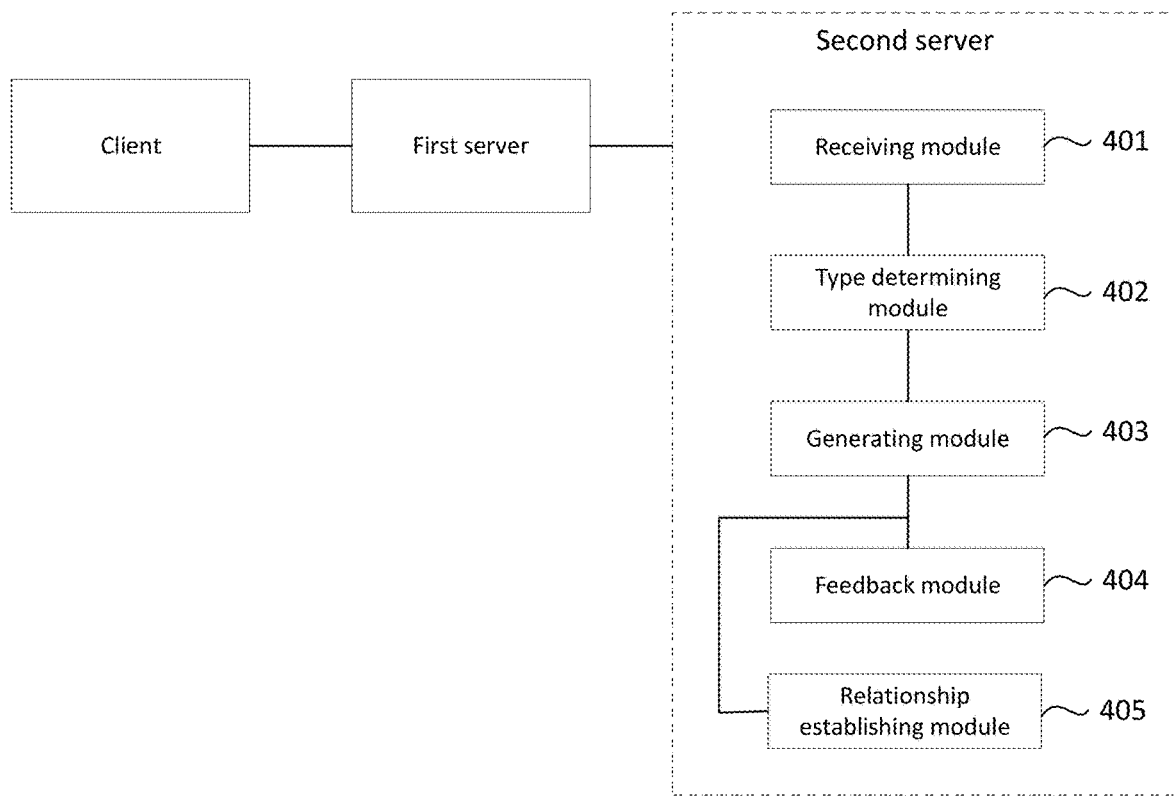
FIG. 4 is a schematic structural diagram of a transaction processing apparatus based on a second server according to some embodiments of the application.

Several embodiments of the transaction processing method provided by the application are described above. Based on the same concept, the application further provides some embodiments of a transaction processing apparatus, as shown in FIG. 4. The transaction processing apparatus shown in FIG. 4 may be provided in a second server, and the apparatus may include: a receiving module 401 configured to receive a first transaction result sent by a first server, where the first transaction result is generated after the first server processes a first transaction request sent by a client; a type determining module 402 configured to determine a type corresponding to the first transaction result; a generating module 403 configured to generate a second transaction result matching the type corresponding to the first transaction result; and a feedback module 404 configured to send the generated second transaction result to the client after the second server receives a second transaction request sent by the client.

In some embodiments, the first transaction request may be a request for placing an order. The first server may include an order server. The first transaction result may include data of the order. The second server may include a payment server, and the second transaction result may include a payment interface or an exception page.

On the basis of the above description, data of the order may include a type identifier of the order server. The type determining module 402 may be further configured to determine the type identifier of the order server included in the order data; the generating module 403 may be further configured to determine a page template corresponding to the data of the order according to a pre-established corresponding relationship between type identifiers and page templates, label data of the order that matches the page template according to the determined page template, and render and construct a payment page according to the labeled data of the order.

The generating module 403 may be configured to determine a payment state according to the data of the order, and when it is determined that the payment state is that a payment may be made, to render and construct a payment page according to the labeled data of the order. When the generating module 403 determines that the payment state is that a payment may not be made, the generating module 403 deletes labels of the data of the order and renders and constructs an exception page.

The data of the order may include an identifier of the client, and the apparatus further includes: a relationship establishing module 405 configured to establish a corresponding relationship between the client's identifier and the payment page or exception page. The feedback module 404 may be configured to determine the client's identifier in the second transaction request and send the generated payment page or exception page corresponding to the client's identifier to the client.

Figure 5:
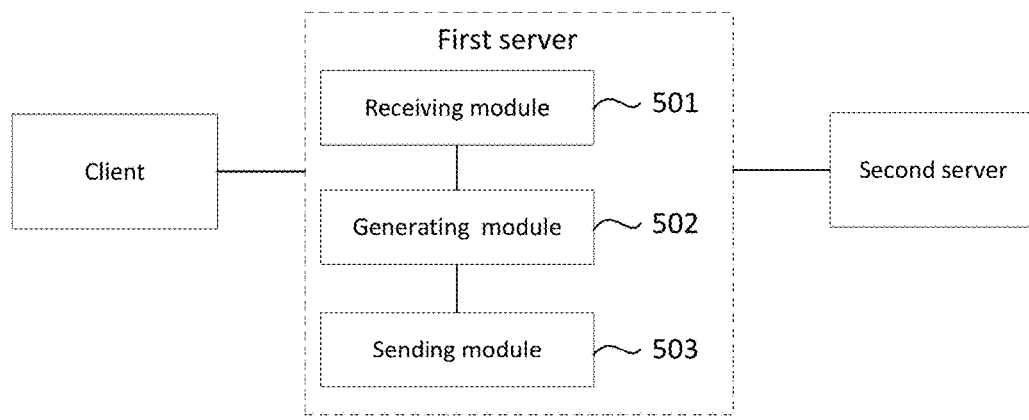
FIG. 5 is a schematic structural diagram of a transaction processing apparatus based on a first server according to some embodiments of the application.

The application further provides a transaction processing apparatus on a first server, as shown in FIG. 5. The apparatus may include: a receiving module 501 configured to receive a first transaction request sent by a client; a generating module 502 configured to generate a first transaction result corresponding to the type of the first server according to the first transaction request; and a sending module 503 configured to send the first transaction result to the client and a second server, to cause the second server to determine a type corresponding to the first transaction result, generate a second transaction result according to the first transaction result and the type, and send the generated second transaction result to the client after the second server receives a second transaction request generated by the client according to the first transaction result.

In the 1990s, an improvement to a technology can be clearly classified as a hardware improvement (e.g., an improvement to a circuit structure, such as a diode, a transistor, a switch, etc.) or a software improvement (an improvement to a flow of a method). With the development of the technologies, however, many current improvements to method flows may be deemed as direct improvements to hardware circuit structures. Designers almost always obtain a corresponding hardware circuit structure by programming an improved method flow into a hardware circuit. Therefore, it cannot be concluded that an improvement to a method flow cannot be realized by a hardware module. For example, Programmable Logic Device (PLD) (e.g., Field Programmable Gate Array (FPGA)) is such an integrated circuit that the integrated circuit's logic functions are determined by a user through programming the device. A designer can program on his/her own to "integrate" a digital system onto one piece of PLD, without asking a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language may be used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most commonly used HDLs include VHDL (Very-High-Speed Integrated Circuit Hardware Description Language) and Verilog. One of ordinary skill in the art should also be aware that it will be very easy to obtain a hardware circuit to implement a logic method flow by using the above HDLs to carry out some simple logic programming on the method flow and program the method flow into an IC.

A controller may be implemented in any proper manner. For example, a controller may be in, for example, a form of a microprocessor or processor, as well as a computer readable medium that stores computer readable program codes (e.g., software or firmware) capable of being executed by the (micro)processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of a control logic of a memory. One of ordinary skill in the art should also be aware that, in addition to that a controller is implemented in a manner of pure computer readable program codes, it is totally feasible to perform logic programming on steps of a method to enable a controller to implement the same functions in a form of a logic gate, a switch, an ASIC, a programmable logic controller, an embedded microcontroller, etc. Therefore, such a controller may be deemed as a hardware part, while devices included in the controller and configured to achieve various functions may also be deemed as a structure inside the hardware part. Alternatively, devices configured to achieve various functions may even be deemed as both software modules to implement a method and a structure inside a hardware part.

The system, apparatus, module, or unit described in the above embodiments may be implemented by a computer chip or entity, or implemented by a product having a function. A typical implementation device is a computer. A computer may be, for example, a personal computer, a laptop computer, a cellular phone, a camera phone, a smart phone, a personal digital assistant, a medium player, a navigation device, an email device, a game console, a tablet computer, a wearable device, or a combination thereof.

For convenience of description, the above device is divided into various units according to functions for description. Functions of the units may be implemented in one or more pieces of software and/or hardware when the application is implemented.

One of ordinary skill in the art should understand that the embodiments of the application may be provided as a method, a system, or a computer program product. Therefore, the application may be implemented as a complete hardware embodiment, a complete software embodiment, or an embodiment combining software and hardware. Moreover, the application may be in the form of a computer program product implemented on one or more computer usable storage media (including, but not limited to, a magnetic disk memory, CD-ROM, an optical memory, etc.) comprising computer usable program codes.

The application is described with reference to flowcharts and/or block diagrams of the method, device (system), and computer program product according to the embodiments of the application. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function specified in one or more processes in the flowcharts and/or in one or more blocks in the block diagrams.

In a typical configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device. According to the descriptions in the specification, the computer readable media do not include transitory media, such as modulated data signals and carriers.

It should be further noted that the terms of "including," "comprising," or any other variants of the terms are intended to encompass a non-exclusive inclusion, causing a process, method, apparatus, or device including a series of elements to not only include these elements, but also include other elements that are not clearly listed, or further include elements that are inherent to the process, method, apparatus, or device. When there is no further restriction, elements defined by the statement "comprising one . . . " or "including one . . . " does not exclude that a process, method, apparatus, or device including the above elements further includes additional identical elements.

One of ordinary skill in the art should understand that the embodiments of the application may be provided as a method, a system, or a computer program product. Therefore, the application may be implemented as a complete hardware embodiment, a complete software embodiment, or an embodiment combining software and hardware. Moreover, the application may be in the form of a computer program product implemented on one or more computer usable storage media (including, but not limited to, a magnetic disk memory, CD-ROM, an optical memory, etc.) comprising computer usable program codes.

The application may be described in a regular context of a computer executable instruction that is executed by a computer, such as a program module. Generally, the program module comprises a routine, a program, an object, a component, a data structure, etc. for executing a particular task or implementing a particular abstract data type. The application may also be practiced in distributed computing environments. In these distributed computing environments, remote processing devices connected via communication networks carry out tasks. In the distributed computing environments, a program module may be located in local and remote computer storage media, including storage devices.

The embodiments in this specification are described in a progressive manner with each embodiment focusing on differences from other embodiments, and the embodiments may be mutually referenced for identical or similar parts. In particular, the system embodiment is described in a relatively simple manner, as the system embodiment is substantially similar to the method embodiment. The description of the method embodiment may be referenced for the related parts.

The above-described is only embodiments of the application, which are not used to limit the application. To one of ordinary skill in the art, the application may have various modifications and changes. Any modification, equivalent substitution, or improvement made within the spirit and principle of the application shall be encompassed by the claims of the application.

What is claimed is:

1. A computer-implemented method for transaction processing, comprising:
   receiving, by a payment server, a first transaction result from a order server, wherein the first transaction result is generated in response to a request for placing an order generated by a client device according to a first operation instruction of a user, wherein the first transaction result comprises data of the order;
   responsive to receiving the first transaction result from the order server:
      determining, by the payment server, a type corresponding to the first transaction result,
      determining, by the payment server, a type identifier of the order server based on the data of the order,
      determining, by the payment server, a page template corresponding to the order according to the type identifier of the order server and a corresponding relationship between type identifiers of servers and page templates,
      labeling, by the payment server, the data of the order that matches the determined page template, and
      pre-generating, by the payment server, a payment page matching the type corresponding to the first transaction result according to the labeled data of the order;
   wherein the order server sends the data of the order to the client device, wherein the data of the order is displayed on an output interface of the client device;
   after pre-generating the payment page matching the type corresponding to the first transaction result, receiving, by the payment server, a payment request generated by the client device according to the first transaction result, a second operation instruction of the user, and the data of the order; and
   in response to receiving the payment request, sending, by the payment server, the pre-generated payment page to the client device, wherein the pre-generated payment page is displayed on the output interface of the client device, and wherein the user browses the pre-generated payment page using the client device to complete a payment transaction for the order on the pre-generated payment page.

2. The method according to claim 1, wherein pre-generating the payment page according to the labeled data of the order comprises:
   determining a payment state according to the data of the order; and
   in response to the payment state being that a payment is allowed to be made, rendering the payment page according to the labeled data of the order.

3. The method according to claim 2, wherein the data of the order comprises an identifier of the client device, and the method further comprises:
   establishing a corresponding relationship between the identifier of the client device and the payment page.

4. The method according to claim 3, wherein sending the pre-generated payment page to the client device comprises:
   determining the identifier of the client device in the payment request; and
   sending the pre-generated payment page corresponding to the identifier of the client device to the client device.

5. A computer-implemented method for transaction processing, comprising:
   receiving, by a order server, a request for placing an order generated by a client device according to a first operation instruction of a user, wherein;
   sending data of the order to the client device, wherein the data of the order is displayed on an output interface of the client device;
   generating, by the first order server, a first transaction result according to the request for placing an order; and
   sending, by the order server, the first transaction result to a payment server to cause the payment server to:
      determine a type corresponding to the first transaction result,
      determine a type identifier of the first order server based on the data of the order,
      determine a page template corresponding to the data of the order according to a pre-established corresponding relationship between type identifiers and page templates,
      label the data of the order that matches the determined page template,
   prior to receiving a payment request generated by the client device according to a second operation instruction of the user and the data of the order, pre-generate a payment page matching the type corresponding to the first transaction result according to the labeled data of the order, and send the pre-generated payment page to the client device after the payment server receives the payment request generated by the client device according to the first transaction result, wherein the pre-generated payment page is displayed on the output interface of the client device, and wherein the user browses the pre-generated payment page using the client device to complete a payment transaction for the order on the pre-generated payment page.

6. An apparatus for transaction processing, comprising one or more processors and one or more non-transitory computer-readable memories coupled to the one or more processors and configured with instructions executable by the one or more processors to cause the apparatus to perform operations comprising:
   receiving, by a payment server, a first transaction result from a order server, wherein the first transaction result is generated in response to a request for placing an order generated by a client device according to a first operation instruction of the user, wherein the first transaction result comprises data of the order;
   responsive to receiving the first transaction result from the order server:
      determining, by the payment server, a type corresponding to the first transaction result,
      determining, by the payment server, a type identifier of the first order server based on the data of the order,
      determining, by the payment server, a page template corresponding to the order according to the type identifier of the first order server and a corresponding relationship between type identifiers of servers and page templates,
      labeling, by the payment server, the data of the order that matches the determined page template, and
      pre-generating, by the payment server, a payment page matching the type corresponding to the first transaction result according to the labeled data of the order;
   wherein the order server sends the data of the order to the client device, wherein the data of the order is displayed on an output interface of the client device;
   after pre-generating the payment page matching the type corresponding to the first transaction result, receiving, by the payment server, a payment request generated by the client device according to a second operation instruction of the user and the data of the order; and
   in response to receiving the payment request, sending, by the payment server, the pre-generated payment page to the client device, wherein the pre-generated payment page is displayed on the output interface of the client device, and wherein the user browses the pre-generated payment page using the client device to complete a payment transaction for the order on the pre-generated payment page.

7. The apparatus according to claim 6, wherein pre-generating the payment page according to the labeled data of the order comprises:
   determining a payment state according to the data of the order; and
   in response to the payment state being that a payment is allowed to be made, rendering the payment page according to the labeled data of the order.

8. The apparatus according to claim 7, wherein the data of the order comprises an identifier of the client device, and the operations further comprise:
   establishing a corresponding relationship between the identifier of the client device and the payment page.

9. The apparatus according to claim 8, wherein sending the pre-generated payment page to the client device comprises:
   determining the identifier of the client device in the payment request; and
   sending the pre-generated payment page corresponding to the identifier of the client device to the client device.

10. The method according to claim 5, wherein pre-generating the payment page comprises:
   determining a payment state according to the data of the order; and
   in response to the payment state being that a payment is allowed to be made, rendering the payment page according to the labeled data of the order.

11. The method according to claim 10, wherein the data of the order comprises an identifier of the client device, and the method further comprises:
   establishing a corresponding relationship between the identifier of the client device and the pre-generated payment page.

12. The method according to claim 11, wherein sending the pre-generated payment page to the client device comprises:
   determining the identifier of the client device in the second transaction request; and
   sending the pre-generated payment page corresponding to the identifier of the client device to the client device.

* * * * *

UNITED STATES PATENT AND TRADEMARK OFFICE
CERTIFICATE OF CORRECTION

| | | |
|---|---|---|
| PATENT NO. | : 11,132,666 B2 | Page 1 of 1 |
| APPLICATION NO. | : 16/421188 | |
| DATED | : September 28, 2021 | |
| INVENTOR(S) | : Fei Ni et al. | |

It is certified that error appears in the above-identified patent and that said Letters Patent is hereby corrected as shown below:

In the Claims

In Claim 5, Column 14, Line 48, "generating, by the first order server" should read -- generating, by the order server --.

In Claim 5, Column 14, Line 54, "a type identifier of the first order server" should read -- a type identifier of the order server --.

In Claim 6, Column 15, Line 27, "the first order server based on the data" should read -- the order server based on the data --.

In Claim 6, Column 15, Line 30, "the type identifier of the first order server" should read -- the type identifier of the order server --.

Signed and Sealed this
Thirteenth Day of June, 2023

Katherine Kelly Vidal
*Director of the United States Patent and Trademark Office*